United States Patent
Birth

[11] 4,418,249
[45] Nov. 29, 1983

[54] FOUR-WIRE TERMINATING CIRCUIT

[75] Inventor: Winfrid Birth, Munich, Fed. Rep. of Germany

[73] Assignee: Siemens Aktiengesellschaft, Berlin & Munich, Fed. Rep. of Germany

[21] Appl. No.: 266,210

[22] Filed: May 22, 1981

[30] Foreign Application Priority Data

May 23, 1980 [DE] Fed. Rep. of Germany ....... 3019835

[51] Int. Cl.$^3$ ............................................. H04B 1/58
[52] U.S. Cl. .......................... 179/170 NC; 179/170 T
[58] Field of Search ............... 179/81 R, 81 A, 170 T, 179/170 NC; 370/28

[56] References Cited

U.S. PATENT DOCUMENTS

| 3,453,395 | 7/1969 | Englund, Jr. | 179/81 A |
| 3,529,099 | 9/1970 | Ribner | 179/81 R |
| 3,751,602 | 8/1973 | Breeden | 179/81 B |
| 3,823,272 | 7/1974 | Tabalba | 179/81 A |
| 4,228,323 | 10/1980 | Feiner et al. | 179/16 F |
| 4,302,636 | 11/1981 | Dumont et al. | 179/170 NC |

FOREIGN PATENT DOCUMENTS 1762849 10/1970 Fed. Rep. of Germany .
2921019  8/1980 Fed. Rep. of Germany .
2916576 10/1980 Fed. Rep. of Germany .

OTHER PUBLICATIONS

Frequenz 28 (1974) 5, Article entitled "Applications of Adaptive Control in Transmission Systems" by Von Karl Heinz Möhrmann.
Agard Conference Proceedings No. 103, pp. 12-1 through 12-16, Article entitled "The Adaptive Equalization of Transmission Systems" by K. H. Moehrmann.
Page 15 of Siemens publication "Druckschrift PCM—Die Pulscode—Modulation und ihre Anwendung im Fernmeldewesen", published 1970.
Appel & Abramson; "Electronic Hybrid for Telephone Using a Differential Amplifier"; IBM Technical Disclosure Bulletin; Oct. 1973; pp. 1513-1514.

Primary Examiner—G. Z. Rubinson
Assistant Examiner—Randall P. Myers
Attorney, Agent, or Firm—Hill, Van Santen, Steadman & Simpson

[57] ABSTRACT

A four-wire termination circuit has a series arrangement of a current source controlled by a transmitting arm of a four-wire line and a first resistor. This arrangement is connected in parallel to a two-wire line terminal impedance formed by a second resistor and an impedance. The terminal impedance terminates the two-wire line in reflection-free fashion. Voltages dependent upon a transmitted signal current which are equal in value but opposed in phase appear across the first and second resistors. A voltage which is dependent upon a received signal current from the two-wire line appears across the second resistor. In a receiving arm of the four-wire line, an intermediate value voltage is present which is independent of the transmitted signal in the transmitting arm.

12 Claims, 3 Drawing Figures

FOUR-WIRE TERMINATING CIRCUIT

BACKGROUND OF THE INVENTION

In order to facilitate communication between two telecommunications stations in a telecommunications system, transmission or repeater devices are required between the telecommunications stations in order to allow sufficiently interference-free signal transmission in both directions of transmission. For this purpose, for each direction of transmission there can be provided a separate transmission line which in the case of multiplex operation is employed in multiple fashion for a plurality of simultaneously existing connections between two telecommunications stations. A four-wire operation of this kind is preferably used at higher telecommunications network levels. In lower telecommunications network levels, and in particular in the region of the subscriber connection lines, generally signal transmission is carried out in duplex operation via two-wire lines. In this case the transmission signals associated with the two directions of transmission can be isolated by means of a hybrid or four-wire circuit which terminates the two-wire line and is comprised of a bridge circuit which converts the two-wire line, for example, into the four-wire section or portion of a subscriber end station (and vice versa). In order to achieve a complete decoupling of the receiving arm of the four-wire line leading away from the four-wire circuit from the transmitting arm of the four-wire line which leads into the four-wire circuit, the bridge circuit must be balanced and for this purpose must contain an exact simulation of the input impedance of the two-wire line. However, in order to ensure a high transmission quality by means of the four-wire circuit, in addition to the decoupling between transmitting and receiving arms of the four-wire line—which is attained when the bridge circuit is balanced—freedom of reflection between the four-wire circuit and the two-wire line is also desirable. This imposes corresponding additional demands on the bridge circuit.

In this respect a four-wire circuit is known (from German No. AS 17 62 849, incorporated herein by reference), which is comprised of a bridge circuit serving as a connecting element between a two-wire line and a four-wire line. The bridge circuit comprises an incoming and an outgoing component which entirely decoupled from one another but which are are each connected to the two-wire line. One arm of the bridge circuit is formed by the surge impedance of the two-wire line, and the second arm, which adjoins the first arm, is formed by a complex impedance which simulates the surge impedance of the two-wire line. The third and fourth arms of the bridge circuit are each formed by a resistor. Bridge circuit diagonals contain those parts of the four-wire line which are to be decoupled, together with their input impedances for the outgoing and incoming components. In this known bridge circuit the outgoing part of the four-wire line, for example the earphone of a telephone subscriber end station, is preceded by an impedance converter which reduces the input impedance of the outgoing component of the four-wire line to a value which is very low in relation to the surge impedance of the subscriber line. The incoming component of the four-wire line, for example the microphone of the telephone subscriber end station, is preceded by an impedance converter which raises the inner impedance of the incoming component of the four-wire line to a value which is very high relative to the surge impedance of the subscriber line.

A bridge circuit of this kind requires not only a transmitting arm located in one diagonal arm of the (balanced) bridge circuit with a very high (in principle infinite) inner impedance value, but also requires a receiving arm which is located in the other diagonal arm of the bridge circuit with a very low input impedance value, which in principle approaches zero. Such a design is provided, not only to achieve decoupling between transmitting and receiving arms of the four-wire line, but also to achieve a reflection-free termination of the two-wire line which a hybrid circuit of this kind, in a concrete construction which approximately achieves the desired resistance values, would not only appear relatively expensive, but also relatively critical in view of parasitic impedances which impede maintaining decoupling (bridge compensation) and freedom from reflection (matching). Outside a relatively narrow band range, this is even rendered impossible. Also, such a design would appear relatively critical with respect to overloading of the active elements of an impedance converter (in order to achieve a resistance value approaching zero) by interference signals occurring outside of the useful signal band, e.g. in the 50 Hz range.

SUMMARY OF THE INVENTION

It is an object of the invention to achieve in a four-wire circuit not only decoupling between the transmitting and receiving arms of the four-wire line but also a reflection-free termination of the two-wire line without the need to provide not only a four-wire line transmitting arm having a high inner impedance value, but also a four-wire line receiving arm which has an input impedance value approaching zero.

With the invention, a four-wire circuit is provided for connecting a two-wire line to the transmitting arm having a high output impedance value, and for connecting the receiving arm of a four-wire line with simultaneous decoupling between the two four-wire line arms. A two-wire line terminal impedance is employed which at least approximately simulates the surge impedance of the two-wire line. The four-wire circuit of the invention has a series arrangement of a signal current source (to whose control input is connected the transmitting arm of the four-wire line) and a first resistor connected in parallel with a two-wire line terminal impedance. This terminal impedance is formed by the series arrangement of a second resistor and a further impedance (which can expediently be constructed by a RC circuit). First terminals of the first and second resistors are directly connected to one another and to one of the two-wire line wires at least in AC fashion. The two other terminals of these two resistors are connected to one another via a series arrangment of third and fourth resistances. The receiving arm of the four-wire line is connected between a connection point of the first and second resistors and the connection point of the third and fourth resistors. This receiving arm is supplied with a received signal which corresponds to an intermediate value voltage at least approximately proportional only to the received signal current. This intermediate value voltage lies between a first and a second voltage. The first voltage occurs across the second resistor of the two-wire line terminating impedance. This resistor is traversed by a part of the transmitted signal current modulated in accordance with the transmitted signal occurring in the transmitting arm of the four-wire line. It is further traversed by the received signal current supplied from the opposite side via the two-wire line. The second voltage occurs across the first resistor of the current source arm which is traversed by the transmitted signal current.

The invention has the advantage that in the four-wire circuit disclosed, over a wide band both decoupling between the transmitting and receiving arms of the four-wire line and a reflection-free termination of the two-wire line is facilitated. Also, the value of the input impedance of the four-wire line receiving arm can be freely selected, and in particular, need not exhibit an extremely small value (zero). It is therefore possible to avoid special construction techniques, including special techniques for overload protection of an input impedance which approaches zero, and associated difficulties concerning construction and dimensioning of the hybrid circuit.

In a further development of the invention the resistance value of the aforementioned second resistor can be at least approximately double that of the aforementioned first resistor, and wherein the two aforementioned resistances which are preferably high in comparison to the first mentioned resistors are of equal value to one another. This takes into account the division of the transmitted signal current supplied by the signal current source between the two-wire line and the two-wire line terminal impedance.

In a further development of the invention the signal current source can be traversed by a feed current supplied via the two-wire line. In this case, on the one hand interference influences caused by any excess voltages which reach the hybrid circuit via the two-wire line are deactivated, and on the other hand an advantageous construction of the signal current source is facilitated.

In a further development of the invention the signal current source can be formed by a transistor which is controlled across its control electrode by the transmitting arm of the four-wire line and is traversed by feed current in its main circuit. This transistor is preferably a field effect transistor whose source resistor forms the aforementioned first resistor. The control current of the field effect transistor here is so low that it leaves the signal current proportionality of the voltage occurring across the resistor virtually unimpaired.

Advantageously, in a further development of the invention, between the terminals connected to one another AC-wise of the first and second resistors, there can be inserted a circuit element which is traversed by feed currents supplied via the two-wire line. From this point there can be tapped a local operating voltage which permits a current supply of the four-wire line section formed, for example, by the four-wire component of a telephone subscriber end station, where there can be provided a circuit element which does not absorb current until a theoretical operating voltage value has been exceeded.

The receiving arm of the four-wire line is to be connected in floating fashion (possibly via opto-couplers) to the four-wire terminating circuit. This is done in order to maintain the symmetry of the two-wire line. Under certain conditions the transmitting arm of the four-wire line can likewise be connected in floating fashion (if need be by optocouplers) to the four-wire terminating circuit in order to perform the same function. Said receiving arm can be directly connected between the connection point of the aforementioned two resistors and the connection point of the aforementioned other two resistors. Alternatively, between the connection point of the first two resistors and the connection point of the second two resistors it is possible to connect the control circuit of a transistor whose output circuit leads to the receiving arm of the four-wire line. On the other hand, it is possible to connect an operational amplifier provided with negative feedback having an output which leads to the receiving arm of the four-wire line.

If, in addition to fulfillment of the requirement for decoupling and freedom from reflection, echo compensation is also to be achieved, in a further development of the invention an adaptive transversal filter can lead from the connection point of the signal current source and the aforementioned first resistor to the connection point of the aforementioned second resistors.

The four-wire terminating circuit in accordance with the invention is not limited to a communications transmission in duplex channel systems. In fact it can also be used in a transmission system employing two-wire line transmission channels which are separate from one another with respect to their time and/or frequency position. In such development the invention, the four-wire circuit is connected to a four-wire line transmitting arm for the transmission of transmitted signal pulses at specific points of time and/or to a cg (cg=center of gravity) of its frequency spectrum and to a four-wire line receiving arm for the reception of received signal pulses at other times and/or to another cg of its frequency spectrum.

DESCRIPTION OF THE PREFERRED EMBODIMENTS

Figure 1:
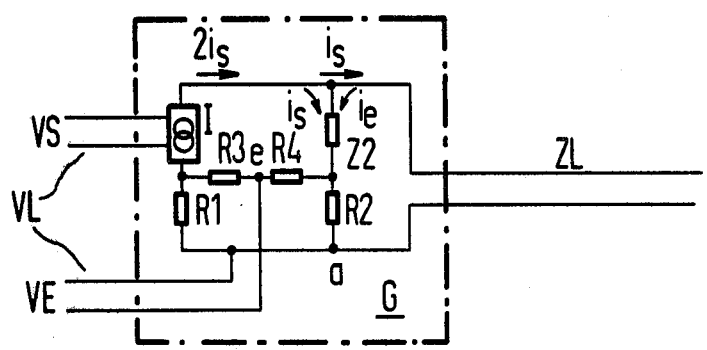
FIG. 1 is a fundamental circuit diagram of a two-wire/four-wire transmission system comprising a four-wire circuit in accordance with the invention.

In the transmission system illustrated in FIG. 1, in which both analogue signals (speech, video) and also digital signals (e.g. items of data) can be transmitted, for the connection of a two-wire line ZL to a four-wire line VL (comprising a transmitting arm VS which receives the information signals and forwards them via the current source I over the two wire line ZL, and a receiving arm VE) while simultaneously decoupling the two four-wire line arms VS, VE from one another, a transformer-free hybrid circuit G is provided. This circuit has a two-wire line terminal impedance Z2, R2 which at least approximately simulates the surge impedance of the two-wire line ZL. The hybrid circuit G contains the series arrangement of a signal current source I, (to the control input of which connects the transmitting arm VS of the four-wire line VL) and a first resistor R1. This series arrangement is connected in parallel with the two-wire line terminal impedance formed by the series arrangement of a second resistor R2 (whose resistance value is at least approximately double that of the first resistor R1) and a further impedance Z2. The first terminals of the resistors R1, R2 are directly connected to one another and to one of the two-wire lines at "a" at least AC-wise. The two other terminals of the two resistors R1, R2 are connected to one another via the series connection of two resistors R3, R4. These two resistors are assumed to be of equal value and at the same time are of a high value in comparison to the first resistor R1 and the second resistor R2. The receiving arm VE of the four-wire line VL is connected between the connection point e of the two resistors R3, R4 and the connection point a of the two resistors R1, R2.

In the circuit arrangement illustrated in FIG. 1, the transmitted signal current $2i_s$ supplied by the current source I (controlled by the transmitting arm VS of the four-wire line VL) is divided between the two-wire line ZL and the two-wire line terminal impedance Z2, R2 in at least approximately equal proportions $i_s$. At the same time, the received signal current $i_e$ supplied via the two-wire line ZL from the opposite station (which is not shown in detail in FIG. 1 but is fundamentally likewise provided with a signal current source) flows through the two-wire line terminal impedance Z2, R2. Therefore a voltage composed of a component $i_e \cdot R2$ which is proportional to the received signal current and a component $i_s \cdot R2$ which is proportional to the transmitted signal current occurs across the resistor R2 of the two-wire line terminal impedance Z2+R2. On the other hand the resistor R1 located in series to the signal current source I is traversed only by the transmitted signal current $2 \cdot i_s$ so that here only a voltage $2 \cdot i_s \cdot R1$ proportional to the transmitted current occurs. The receiving arm VE of the four-wire line VL connected between the connection point a of the two resistors R1, R2 and the connection point e of the two resistors R3, R4 is supplied with a received signal. This received signal corresponds to an intermediate voltage value which is merely proportional to the received signal current. This intermediate voltage lies between a first voltage occurring across the resistor R2 of the two-wire line terminal impedance and a second voltage occurring across the resistor R1 of the current source arm. The mutual compensation of the voltages proportional to the transmitted signal current (which occur across the two resistors R1 and R2) is brought about as a result of the intermediate voltage value formation. This is not, as previously assumed, dependent upon the fact that the resistance value of the second resistor R2 should be double that of the first resistor R1 and that the resistance value of the resistor R3 should be equal to that of the resistor R4. Rather, it is sufficient for (approximately) $R2 \cdot R3 = 2 \cdot R1 \cdot R4$ where the resistance values of the resistors R3 and R4 are high in comparison to the values of the resistors R1 and R2 and consequently, any influence of the received signal current $i_e$ via the resistors R3, R4 upon the transmitted signal current source I is negligible.

Figure 2:
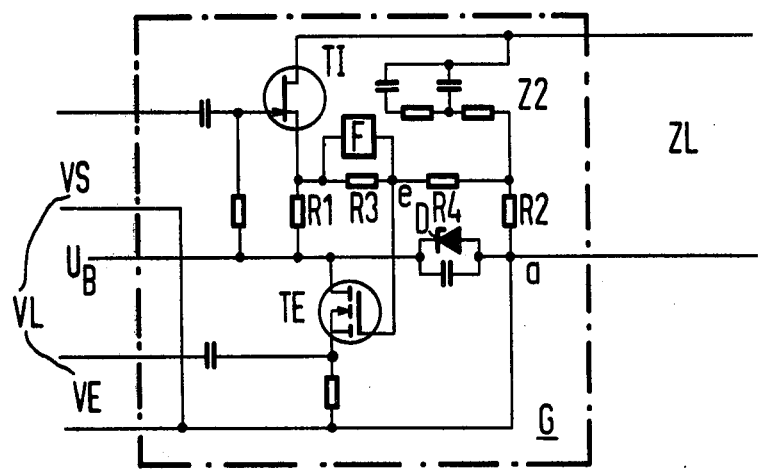
FIG. 2 illustrates circuit details of an exemplary embodiment of such a four-wire circuit.

In the event of a two-wire line terminal impedance which is impermeable to DC, the parallel arrangment of the two-wire line terminal impedance Z2, R2 and the current source arm I, R1 can also be used as a feed filter for a feed current supplied via the two-wire line ZL, so that the signal current source I is traversed by the feed current supplied via the two-wire line ZL. In this case the signal current source I can be formed by a transistor TI which is traversed by feed current and which is controlled at its control electrode by the transmitting arm VS of the four-wire line VS, as indicated in FIG. 2. In the hybrid circuit G illustrated in FIG. 2, the signal current source is comprised of a field effect transistor TI which as far as possible is temperature stable and also exhibits dielectric strength. For example, a N-channel blocking layer field effect transistor can be employed preferably having a steep gradient, and whose source resistor forms the aforementioned first resistor R1 having a resistance value of, for example, 50Ω. Via a coupling element formed by a capacitor of, for example, 10 nF and a resistor of, e.g. 1 MΩ, the field effect transistor TI can be controlled from the transmitting arm VS such as by a microphone amplifier or a data source so that the feed current is correspondingly modulated and thus a corresponding transmitted signal current is produced.

Figure 2A:
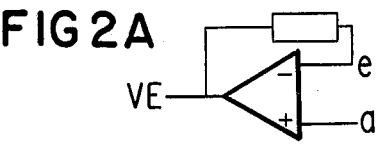
FIG. 2A shows an alternate embodiment of the circuit of FIG. 2.

The two-wire line terminal impedance Z2, R2, which cannot pass direct current, as shown in FIG. 2, is comprised of the series arrangement of the aforementioned second resistor R2 having a value of, e.g. 100Ω, and the further impedance Z2 which is required for further simulation of the two-wire line surge impedance in accordance with the two-wire line type and which can advantageously be formed by a RC circuit, possibly a RC continued fractions arrangement as also indicated in FIG. 2. Between the connection point e of the two resistors R3, R4, which will each be assumed to have a resistance value of e.g. 100 kΩ, and the circuit point a at which the two resistors R1 and R2 are directly connected to one another AC-voltage wise, the four-wire circuit G illustrated in FIG. 2 contains the control path of a transistor TE. This transistor may be a depletion IG field effect transistor having a N-channel which operates as a simple source follower from whose source resistor the received signal for the receiving arm VE of the four-wire line VL is obtained via a capacitor. As shown in FIG. 2A, alternatively to the transistor TE it is possible to provide an operational amplifier with negative feedback which is connected by its inverting input to the received signal circuit point e, by its other input to the circuit point a, and by its output leads to the receiving arm VE of the four-wire line VL. This then avoids any remaining influence of the received signal on the signal current source transistor TI.

As can also be seen from FIG. 2, parallel to the resistor R3 there can be arranged an adaptive transversal filter F which conducts an echo compensation signal to the received signal circuit point e in order to further increase the decoupling between the transmitting arm VS and the receiving arm VE of the four-wire line VL. It is fundamentally known (e.g. from FREQUENZ 28 (1974) 5, 118 . . . 122 and 155 . . . 161, incorporated herein by reference) to eliminate transmitted signal dependent interference signals which occur in the receiving arm of a four-wire circuit by the addition or subtraction of compensation signals. Echo compensation of this kind is unnecessary for discussion here since those skilled in the art understand the echo compensation described above.

Between the terminals of the first resistor R1 and the second resistor R2 which are connected to one another AC-wise, in the feed circuit there is inserted a circuit element D with a parallel capacitor for AC coupling, and traversed by the feed current supplied via the two-wire line ZL and from which a local operating voltage $U_B$ can be tapped (for transmitting and receiving circuits of the four-wire line and for the hybrid circuit itself). In the circuit arrangement illustrated in FIG. 2 this circuit element is formed by a Zener diode. In contrast to the illustration in FIG. 2, however, the Zener diode can be replaced by a circuit which absorbs current only when the operating voltage $U_B$ has reached an operating voltage theoretical value.

As already mentioned in the introduction, the four wire circuit in accordance with the invention is not limited to communications transmission in duplex channel systems, but can also be used in a transmission system employing two-wire line transmission channels which are separate from one another with respect to time position and/or frequency position. The four wire circuit is then connected to a four-wire line transmitting arm VS for the transmission of transmitted signal pulses at specific times and/or with a specific cg point of its frequency spectrum; and it is further connected to a four-wire line receiving arm VE for the reception of received signal pulses at other times and/or with a different cg of its frequency spectrum. In the transmitting arm VS of the four-wire line VL the four-wire terminating circuit can be preceded by a chain arrangement of a speech signal coder formed, for example, by a delta modulator, and a digital signal transmitting circuit for the transmission of transmitted signal pulses, for example, at specific points of time. In the receiving arm VE of the four-wire line VL the four-wire terminating circuit can be followed by a chain arrangement of a corresponding digital signal receiving circuit and a speech signal decoder possibly formed by a delta demodulator. The aforementioned digital signal transmitting circuit can, for example, emit pseudo-ternary half-step signal pulses, so-called half-bauded AMI (alternate mark inversion) signal pulses for which purpose, as proposed elsewhere (German Pat. No. 29 16 576, incorporated herein by reference), it can comprise a ROM which stores instantaneous values of the transmitted signal pulses in coded form. It is operated in accordance with the digital signals emitted from the speech signal coder and it conducts the corresponding instantaneous values in their coded form to a decoder which subsequently forms the corresponding transmitted signal pulses. The digital signal receiving circuit can contain a regenerator such as is fundamentally known (for example from Siemens publication "PCM- Die Pulscode-Modulation und ihre Anwendung im Fernmeldewesen", page 15 FIG. 21, incorporated herein by reference), and in which a clock extractor is used to extract from the received signal pulses a received bit pulse train which serves to define the decision times at which the amplitude decision with respect to the relevant status value of the bit in question is made in the digital signal receiving circuit. Furthermore the digital signal receiving circuit can contain a received signal converter which can be constructed, for example, from a rectifier circuit which converts the regenerated signals into corresponding ΔM or PCM signals. As proposed elsewhere (German AS No. 29 21 019, incorporated herein by reference), the transmitted bit pulse train can be derived from the received bit pulse train and displaced in phase relative to the latter by half a bit time interval. However such circuitry details of the transmitting arm VS and the receiving arm VE of the four-wire line VL have not been shown in the drawing and need not be discussed since this is not essential to an explanation of the invention for one skilled in this art.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A four-wire termination circuit for connecting a two-wire line having a given surge impedance to a transmitting arm and a receiving arm of a four-wire line while simultaneously decoupling the two arms of the four-wire line from one another, comprising:

a terminal impedance connected across the two-wire line which at least approximately simulates the surge impedance of the two-wire line;

a series arrangement of a first resistor and a signal current source which causes a transmitted signal current to flow when a signal is applied to a control input thereof by the transmitting arm connected for controlling the signal current source;

the terminal impedance being formed by a series arrangement of a second resistor and a further impedance, and being connected in parallel to the series arrangement of the signal current source and first resistor;

the first and second resistors each having one of their terminals coupled to one another and to a first of the two-wire line wires;

the other terminals of the first and second resistors being connected to one another via a series arrangement of third and fourth resistors;

the receiving arm of the four-wire line being connected between the connection of the first and second resistors and the connection of the third and fourth resistors; and values of said first, second, third and fourth resistors being chosen such that said receiving arm is supplied with a received signal which corresponds to an intermediate voltage substantially proportional to a received signal current from the two-wire line, said intermediate voltage lying between a first and second voltage, the first voltage occurring across the second resistor as a result of a portion of said transmitted signal current modulated in accordance with the transmitted signal in the transmitting arm and by the received signal current flowing therein supplied from the two-wire line, and said second voltage occurring across the first resistor as a result of said transmitted signal current flowing therein.

2. A circuit according to claim 1 wherein the resistance of the second resistor is substantially double that of the first resistor and the third and fourth resistors are of substantially equal value to one another.

3. A circuit according to claim 1 wherein the third and fourth resistors are high in value relative to the first and second resistors.

4. A circuit according to claim 1 wherein said further impedance is formed by a RC circuit.

5. A circuit according to claim 1 wherein feed current supplied via the two-wire line flows through the signal current source.

6. A circuit according to claim 5 wherein the signal current source is formed by a transistor through which said feed current flows, and is controlled at its control electrode by the transmitting arm of the four-wire line.

7. A circuit according to claim 6 wherein said transistor comprises a field effect transistor, a source resistor associated therewith comprising the first resistor.

8. A circuit according to claim 5 wherein terminals of the first and second resistors are coupled to one another by a circuit element traversed by feed current supplied via the two-wire line, and wherein a local operating voltage is tapped therefrom.

9. A circuit according to claim 8 wherein said circuit element does not absorb current until a given operating voltage value is exceeded.

10. A circuit according to claim 1 wherein between the connection of the first and second resistors and the connection of the third and fourth resistors there is connected a control lead of a transistor whose output leads are connected to the receiving arm of the four-wire line.

11. A circuit according to claim 1 wherein between the connection of the first and second resistors and the connection of the third and fourth resistors there is connected an input of an operational amplifier with negative feedback whose output leads are connected to the receiving arm of the four-wire line.

12. A circuit according to claim 1 wherein the transmitted signal current flowing in the first resistor is $2i_s$ and the part of the transmitted signal current flowing in the second resistor is $i_s$.

* * * * *